United States Patent [19]
Fussell, Jr.

[11] 3,796,095
[45] Mar. 12, 1974

[54] BLUFF BODY FLOWMETER UTILIZING A MOVABLE MEMBER RESPONSIVE TO VORTEX SHEDDING

[75] Inventor: Theodore John Fussell, Jr., Bridgewater Township, Somerset County, N.J.

[73] Assignee: Eastech, Inc., South Plainfield, N.J.

[22] Filed: Oct. 1, 1971

[21] Appl. No.: 185,746

[52] U.S. Cl. ............................................. 73/194 B
[51] Int. Cl. ....................... G01f 1/00, G01p 5/00
[58] Field of Search ........................................ 73/194

[56] References Cited
UNITED STATES PATENTS

| | | | |
|---|---|---|---|
| 3,572,117 | 3/1971 | Rodely | 73/194 |
| 3,693,438 | 9/1972 | Yamasaki et al. | 73/194 |
| 3,587,312 | 6/1971 | McMurtrie | 73/194 |
| 3,564,915 | 2/1971 | Tomota et al. | 73/194 |

FOREIGN PATENTS OR APPLICATIONS

| | | | |
|---|---|---|---|
| 441,905 | 1/1969 | Japan | 73/194 |
| 508,880 | 10/1920 | France | 73/194 |

OTHER PUBLICATIONS

Sharpsteen, "Fluid Amplifier Measures Flow Velocity", Control Engineering, Jan. 1966, p. 103.

*Primary Examiner*—Herbert Goldstein

[57] ABSTRACT

A bluff body flowmeter includes a bluff body having a base surface facing fluid flow, a pair of converging downstream surfaces, a pair of orifices proximate the downstream surfaces, means movable in response to vortex induced pressure changes in the orifices (e.g., a cylindrical shuttle body having an encapsulated ferromagnetic disc) and means responsive to the motion of the movable means for producing an electrical signal related to volumetric flowrate (e.g., a magnetic detector which detects perturbations produced by the disc in a magnetic field established near the movable means.)

24 Claims, 8 Drawing Figures

3,796,095

BLUFF BODY FLOWMETER UTILIZING A MOVABLE MEMBER RESPONSIVE TO VORTEX SHEDDING

BACKGROUND OF THE INVENTION

This invention relates to flowmetering equipment and more particularly to bluff body devices for producing in a flowing fluid an oscillating signal which varies in frequency in accordance with the flowrate.

In U.S. Pat. No. 3,572,117 of A.E. Rodely, assigned to the assignee hereof, there is described a flowmeter which incorporates a bluff body for generating oscillating wakes, or shedding vortices, in a fluid flowing through a pipe to produce high signal-to-noise ratio signals which are free from intermittency and are sensed outside of the wake in the flow near and upstream from the body. While various bluff body configurations are disclosed, each of the bodies includes a base surface facing the flow and downstream surfaces to control the oscillatory flow. One particular configuration constitutes a substantially triangular right prism in which the base of the triangle faces the fluid flow and the sides of the triangle form a pair of converging downstream surfaces. Alternately, for example, the base of the body may be convex. To produce nonintermittent oscillating flow in each case the base and length of the body satisfy prescribed dimensions discussed more fully hereinafter.

An improved version of the Rodely bluff body flowmeter, disclosed in my copending application Ser. No. 111,829 filed on Feb. 2, 1971 and assigned to the assignee hereof, permits measurements of flowrate to be made in the high turbulence flow zone directly downstream of the bluff body base surface. In this version, the bluff body includes a first channel which extends between the downstream surfaces and a second channel which communicates between the first channel and the exterior of the conduit in which the body is mounted. The second channel is adapted to receive a sensor typically carried at the end of a rod inserted in the channel. The sensor is positioned at the intersection of the two channels in order to detect vortex induced changes (e.g., pressure or velocity changes) in the fluid flowing in the first channel.

While the Rodely bluff body flowmeter and my aforementioned improved version thereof represent significant advances in the state of the art, both illustratively employ a thermistor sensor which requires a power supply as a necessary part of the electronic equipment which generates the electrical signal related to volumetric flowrate. Moreover, usable signals require additional equipment to perform such functions as compensation, filtering and triggering.

It is therefore one object of my invention to reduce manufacturing costs and to produce high quality signals related to flowrate without the need for a separate power supply for the sensor and without the need for compensation, filter or trigger circuits common to earlier flowmeters.

In some applications it is desired to measure the flowrate of highly corrosive fluids which, however, can be extremely detrimental where, as in earlier, flowmeters, the sensor is in direct contact with the fluid. In other applications it is desirable to be able to measure fluids which are so hot as to be detrimental to the sensors used.

In addition, where the sensor contacts directly the flowing fluid, there exists, especially in high static pressure systems, a potential leakage path past the detector even though care is taken in providing fluid seals.

It is therefore another object of my invention to measure the flowrate of high corrosive fluids and hot fluids as well as fluids flowing in high static pressure systems.

SUMMARY OF THE INVENTION

These and other objects are accomplished in accordance with my invention, a bluff body flowmeter including a bluff body having a base surface facing fluid flow, a pair of converging downstream surfaces, a pair of orifices proximate the downstream surfaces, means movable in response to vortex induced pressure changes in two orifices, and means responsive to the motion of the movable means for producing an electrical signal related to volumetric flowrate.

In an illustrative embodiment, one orifice is located in each downstream surface and the two orifices communicate with each other through a first channel extending between the downstream surfaces; the movable means is disposed in the first channel and comprises a cylindrical body having a ferromagnetic disc encapsulated therein; means are provided for retaining the movable means within the first channel; and a permanent magnet generates a magnetic field in the region of the first channel. In operation, as the cylindrical body moves back and forth in the first channel in response to periodic pressure changes associated with vortex shedding from the bluff body, the ferromagnetic disc passes through the magnetic flux lines and perturbs the field of the magnet. This perturbation generates in the windings of a magnetic detector an EMF related to the flowrate.

The magnetic detector is illustratively inserted in the bluff body in a second channel which is parallel to the downstream surfaces and which extends from the exterior of the conduit in which the bluff body is mounted to a region proximate to the first channel. Since, however, the first and second channels do not communicate with one another, it is possible to measure the flowrate of corrosive fluids which flow only in the first channel and hence cannot contact the detector located in the second channel. Moreover, this feature also permits the measurement of fluids in high static pressure systems, i.e., the lack of communication between the two channels prevents leakage of fluid past the detector.

I have found that my invention is relatively insensitive to disturbances such as pipe vibrations and fluid sloshing in the pipes. Moreover, the high quality electrical signals produced by my flowmeter require only amplification and hence permit considerable savings in manufacturing costs since expensive equipment such as power supplies, compensators, filters and trigger circuits are not required. In addition, wide temperature ranges can be covered without the need to change the detector or to make adjustments in the associated electronic equipment.

Other embodiments of my invention discussed hereinafter permit, for example, the magnetic detector and/or the movable means to be located exterior to the bluff body and, in one case, exterior to the conduit.

BRIEF DESCRIPTION OF THE DRAWING

The above and other objects of my invention, together with its various features and advantages, can be easily understood from the following more detailed discussion, taken in conjunction with the accompanying drawings, in which.

DETAILED DESCRIPTION

Figure 1A:
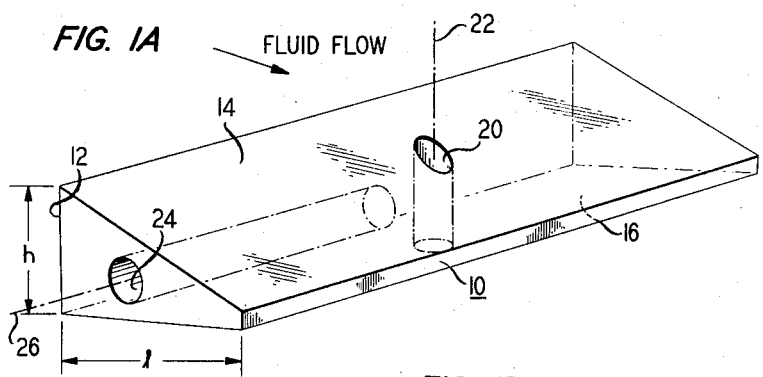
FIG. 1A is a pictorial view of a bluff body for use in accordance with one embodiment of my invention.

Turning now to FIG. 1A, there is shown a pictorical view of a bluff body 10 in the form of a right triangular prism having a planar base surface 12 facing fluid flow and a pair of converging downstream surfaces 14 and 16, typically of equal length. As disclosed in the aforementioned patent, the ratio of the axial length $l$ to the height $h$ of the base surface 12 is between 1 and 2; and the ratio of the height $h$ of the base surface 12 to the inner diameter of the conduit (not shown) in which body 10 is mounted is between 0.15 and 0.4. Dimensions within these limits prevent the flow streams passing above and below the body 10 from intermingling and interacting until a favorable distance downstream of the edges of the base surface 12 and thereby desirably generating strong oscillatory flow without intermittency.

In addition, the bluff body 10 is illustratively provided with first and second cylindrical channels 20 and 24 which have axes 22 and 26, respectively, which intersect at right angles to one another. The first cylindrical channel 20 extends between the downstream faces 14 and 16 and parallel to base surface 12 and forms a pair of orifices, one in each downstream face. Note that channel 20 is located downstream of the edges of base surface 12 where, as described in the aforementioned Pat. No. 3,572,117, the boundary layers of the fluid separate from the bluff body to produce vortex shedding. The second cylindrical channel 24 extends parallel to downstream surfaces 14 and 16 as well as base surface 12 and communicates from the exterior of the conduit (not shown) to a region near to the first channel 20. Importantly, however, channels 20 and 24 do not communicate with one another thereby preventing fluid in first channel 20 from leaking out of the conduit through second channel 24 and moreover permitting the measurement of the flowrate of corrosive fluids as mentioned previously.

Figure 1B:
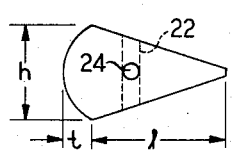
FIGS. 1B and 1C are end views of alternate bluff bodies for use in accordance with my invention.
Figure 1C:
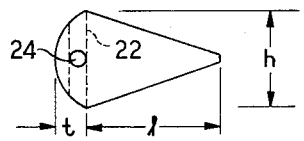

Before discussing in detail the manner in which the foregoing bluff body is adapted to measure volumetric flowrates, it should be noted that body 10 can have various other geometric configurations including those shown in FIGS. 1B and 1C in which the base surface 12 is convex. In these cases, as also discussed in the Rodely patent, the ratio of the axial dimension $t$ to the base height $h$ is 0.3 or less, and the ratio of the total axial length $l$ plus $t$ to the base height $h$ is advantageously between 1 and 2, in order to produce high signal-to-noise ratio signals free from intermittency. Moreover, the channels 22 and 24 may either be located in the body between the downstream surfaces (FIGS. 1A and 1B) in a high turbulence flow zone or in the convex portion (FIG. 1C) in a low turbulence flow zone.

Figure 2:
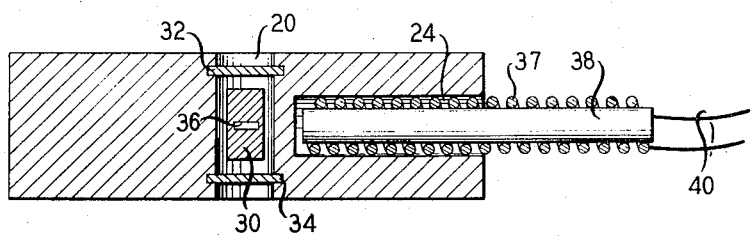
FIG. 2 is a partial cross sectional view of one embodiment of my invention.

Each of the foregoing bluff bodies produces vortex shedding which induces changes (e.g., in pressure, velocity) in the fluid which flows in first channel 20. These changes, which are related to the flowrate, are detected in accordance with my invention in the following illustrative manner. As shown in FIG. 2, a movable member, illustratively a cylindrical shuttle body 30, is disposed in first cylindrical channel 20 and is retained therein by means of pins 32 and 34 rigidly affixed across each end of channel 20 on either side of shuttle body 30. Alternately, the pins may be replaced by snap rings or other equivalent retaining means. Encapsulated in the center of body 30 is a ferromagnetic disc 36 the plane of which is perpendicular to the axis of body 30. Inserted into second channel 24 is a permanent magnet in the shape of a rod 38 which generates a magnetic field in the first channel 20. A magnetic detector, shown illustratively to be a winding 37 wrapped around rod 38, and electrically insulated therefrom, senses perturbations in the magnetic field and generates on leads 40 an electrical signal related thereto.

Figure 3:
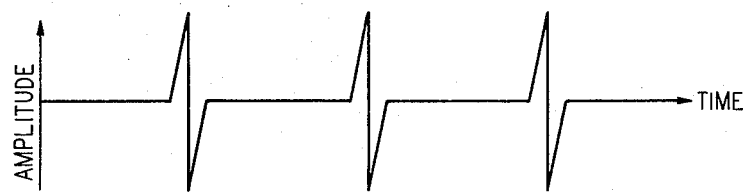
FIG. 3 shows a typical electrical signal generated by the embodiment of FIG. 2.

In operation, vortex shedding by bluff body 10 induces in first channel 20 periodic pressure changes which cause shuttle body 30 to move back and forth along axis 22 with a frequency related to volumetric flowrate. The consequent motion of ferromagnetic disc 36 perturbs the magnetic field and induces an EMF in the windings 37 of the magnetic detector. FIG. 3 shows an illustrative periodic voltage signal produced on leads 40. The signal is spike-shaped and electronically clean due to the geometry and alignment of the disc 36 and consequently requires only amplification to produce a usable signal, i.e., no compensation, filtering or triggering is required as previously discussed.

Figure 4:
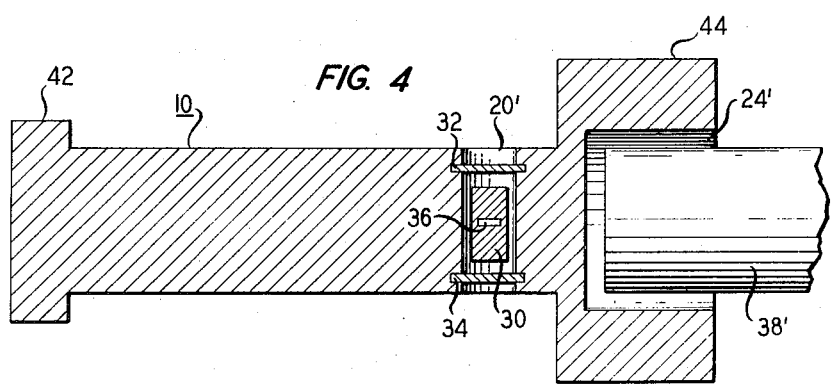
FIG. 4 is a partial cross sectional view of another embodiment of my invention in which the detector is external to the bluff body.

In situations in which the rod and/or detector are too large to fit into the bluff body itself, the embodiment of FIG. 4 is useful. More specifically, the second channel 24' is located in a typically cylindrical boss portion 44 used (with boss member 42) to mount the bluff body 10 transversely in a conduit (not shown). The rod 38' is inserted into channel 24', and the first channel 20' is located near boss member 44 instead of being centrally located as in FIG. 2. The operation of this embodiment, however, is identical to that described with reference to FIG. 2.

It is to be understood that the above-described arrangements are merely illustrative of the many possible specific embodiments which can be devised to represent application of the principles of my invention. Numerous and varied other arrangements can be devised in accordance with these principles by those skilled in the art without departing from the spirit and scope of my invention. More particularly, the movable member can take on various geometrics such as spheres, bellows or diaphragms. Moreover, the detection apparatus could employ the movable member to interrupt or reflect a light beam, sonic beam or microwave beam. For example, a light beam could be directed along axis 26 (FIG. 2 or 4) from one side of the shuttle body 30 and a photodiode positioned on axis 26 on the other side of body 30 could be used to detect that beam when the shuttle body moves off axis 26. Optical detection may be more readily achieved, however, by employing an external shuttle body as in FIG. 5B. Also, the movable member could be used to inductively or capacitively tune/detune an electronic oscillator circuit.

Figure 5A:
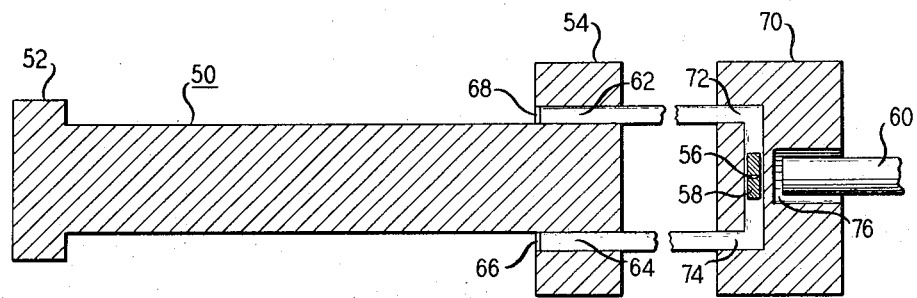
FIG. 5A is a partial cross sectional view of yet another embodiment of my invention in which both the detector and the shuttle body are exterior to the bluff body.
Figure 5B:
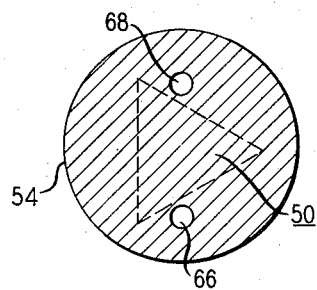
FIG. 5B is an end view of FIG. 5A.

More specifically, FIGS. 5A and 5B illustrate yet another embodiment of my invention wherein the detection of vortex shedding by the several detecting means described takes place external to the bluff body and the conduit, a useful feature especially where the fluid is so hot as to be detrimental to the sensors used. As before, the bluff body 50 has end boss members 52 and 54 for mounting the body in a conduit (not shown). Boss member 54 includes a pair of orifices 66 and 68, one of which is disposed adjacent each of the downstream surfaces (FIG. 5B). These orifices are coupled through ducts 62 and 64 in member 54 to detection means mounted in housing 70 located exterior to the conduit. Housing 70 has a shuttle channel 73 which is coupled via segments 72 and 74 to ducts 62 and 64 and in which is disposed a shuttle body 58, including a ferromagnetic disc 56. A magnetic rod 60 is inserted into aperture 76 of a detector channel to a region proximate to shuttle body 58.

In operation, vortex induced pressure changes at orifices 66 and 68 are coupled through ducts 62 and 64 to shuttle body 58 which thus moves up and down at a frequency related to volumetric flowrate. Perturbation of the field of rod 60 generates an electrical signal as previously described.

Optionally, the orifices 66 and 68 may be sealed with a flexible diaphragm and the ducts filled with a fluid to prevent dirty or harmful fluids from contacting the shuttle body 58. Similarly, the channels 20 and 20' of FIGS. 2 and 4, respectively, may be sealed and filled with a fluid.

What is claimed is:

1. Apparatus for measuring the flowrate of fluid in a conduit comprising
   a vortex shedding body having a planar base surface disposed substantially normal to the direction of fluid flow,
   a pair of downstream surfaces extending downstream from said base surface and meeting said base surface along a pair of edges,
   said base and downstream surfaces being mutually adapted so that the boundary layers of said fluid separate from said body at said edges and so that vortex shedding is free of intermittency, and
   having an orifice adjacent to each of said downstream surfaces and downstream of said base surface,
   said apparatus including a first channel connecting together said orifices,
   means movable in said first channel in response to vortex-induced changes at said orifices,
   a second channel substantially parallel to said downstream surfaces and for extending from an exterior of said conduit to a region therein proximate to and in nonfluid flow communication with with said first channel, and
   means disposed at least partially in said second channel and responsive to the motion of said movable means for producing an electrical signal related to said flowrate.

2. The apparatus of claim 1 including flexible diaphragm means for sealing each of said orifices and fluid means filling said first channel.

3. The apparatus of claim 1 wherein said vortex shedding body includes at least one support member at an end thereof for mounting said vortex shedding body in said conduit, said first channel is asymmetrically located in said vortex shedding body near to said support member and said second channel extends only into said support member.

4. The apparatus of claim 3 wherein said orifices are located in said support member adjacent to said downstream surfaces, and said first channel including duct means for coupling together said orifices, said shuttle body being located within said duct means.

5. The apparatus of claim 4 wherein said duct means extends exterior to said conduit and including a housing having a shuttle channel therein for receiving said shuttle body and a detector channel therein proximate to said shuttle channel for receiving at least a portion of said responsive means, said duct means being coupled to said shuttle channel so that vortex induced pressure changes at said orifices cause said shuttle body to move in accordance with volumetric flowrate.

6. The apparatus of claim 1 wherein said vortex shedding body includes at least one support member at an end thereof for mounting said body in said conduit, said orifices are located in said support member adjacent to said downstream surfaces and said first channel is included in said support member and comprises duct means for coupling together said orifices, said movable means being located in said duct means.

7. The apparatus of claim 6 wherein said duct means extends exterior to said conduit and including a housing having a shuttle channel therein for receiving said movable means and said second channel included therein proximate to said shuttle channel for receiving at least a portion of said responsive means, said duct means being coupled to said shuttle channel so that vortex induced pressure changes at said orifices cause said movable means to move in accordance with volumetric flowrate.

8. The apparatus of claim 1 wherein
   said responsive means includes means for generating a magnetic field near to said movable means and means for detecting perturbations of that field, and
   said movable means includes a shuttle body means for perturbing said magnetic field.

9. The apparatus of claim 7 wherein said shuttle body perturbing means comprises a ferromagnetic disc member encapsulated in a center of the shuttle body and in a plane which is substantially perpendicular to the axis of said body.

10. The apparatus of claim 9 wherein said movable means comprises a right cylindrical shuttle body and said ferromagnetic member comprises a disc the plane of which is normal to the axis of said shuttle body.

11. The apparatus of claim 10 wherein said ferromagnetic member is encapsulated in said shuttle body.

12. The apparatus of claim 10 wherein said first channel extends directly between said downstream surfaces and said vortex shedding body has a second channel extending from the exterior of said conduit to a region near to said first channel, said responsive means being disposed at least partially in said second channel.

13. The apparatus of claim 12 wherein said responsive means includes a permanent magnet rod inserted into said second channel to generate said magntic field in said first channel and winding means disposed to detect EMFs induced therein by perturbations of said field by said ferromagnetic disc.

14. The apparatus of claim 13 wherein said winding is wrapped around said rod and is electrically insulated therefrom.

15. The apparatus of claim 13 wherein said first channel is centrally located in said vortex shedding body and said second channel extends parallel to said base surface.

16. The apparatus of claim 13 wherein said vortex shedding body includes at least one support member at an end thereof for mounting said vortex shedding body in said conduit, said first channel is asymmetrically located in said vortex shedding body near to said support member, and said second channel extends only into said support member.

17. The apparatus of claim 12 wherein said first channel is substantially parallel to said base surface and normal to said second channel.

18. The apparatus of claim 17 wherein said second channel is substantially parallel to all of said base and downstream surfaces.

19. The apparatus of claim 1 wherein said downstream surfaces are tapered from said edges to converge downstream in said fluid flow in said conduit, and said first channel extends directly between said downstream surfaces for connecting together said orifices, each of which is defined in an individual one of said converging downstream surfaces.

20. Apparatus for measuring the flowrate of fluid in a conduit comprising a bluff body having a base surface facing fluid flow and effective to produce vortex shedding in said fluid, said surface extending along a diameter of said conduit and between the walls thereof and having further a pair of planar converging surfaces extending downstream of said base surface forming substantially triangular cross section of said bluff body, said converging surfaces meeting said base surface along a pair of edges, said base and downstream surfaces being mutually adapted so that the boundary layers of said fluid separate from said body at said edges and so that vortex shedding is free of intermittency, said bluff body having a first channel extending between said converging surfaces and parallel to said base surface and a second channel extending from the exterior of said conduit to a region near to said first channel and parallel to said base and converging surfaces, said second channel being in nonfluid flow communication with said first channel, the ratio of the axial length of said body to the height of said base surface being between 1 and 2 and the ratio of the height of said base surface to the inner diameter dimension of said conduit transverse to the longitudinal axis thereof being between 0.15 and 0.4, an elongated permanent magnet disposed in said second channel for producing a magnetic field in said first channel, winding means for producing an EMF in response to perturbations of said field, a shuttle body disposed in said first channel and being movable in response to vortex induced pressure changes therein, ferromagnetic means included in said shuttle body for perturbing said field, and means for retaining said shuttle body within said first channel.

21. The apparatus of claim 20 wherein said shuttle body is a right cylinder having its axis parallel to that of said first channel and said ferromagnetic means comprises a disc the plane of which is normal to said axis said shuttle body.

22. The apparatus of claim 21 wherein said disc is encapsulated in said shuttle body.

23. The apparatus of claim 22 wherein said shuttle body is a right circular cylinder and said ferromagnetic member is a circular disc.

24. The apparatus of claim 23 wherein said winding means is wrapped around said magnet and electrically insulated therefrom.

* * * * *